Jan. 10, 1967  F. M. ROBINSON  3,297,024
MASSAGING MACHINE HAVING SUCTION MEANS
AND OPPOSITELY ROTATING ROLLERS
Filed Nov. 4, 1963  2 Sheets-Sheet 1

INVENTOR.
FRED M. ROBINSON,
BY
Linton and Linton
ATTORNEYS.

Jan. 10, 1967 F. M. ROBINSON 3,297,024
MASSAGING MACHINE HAVING SUCTION MEANS
AND OPPOSITELY ROTATING ROLLERS
Filed Nov. 4, 1963 2 Sheets-Sheet 2
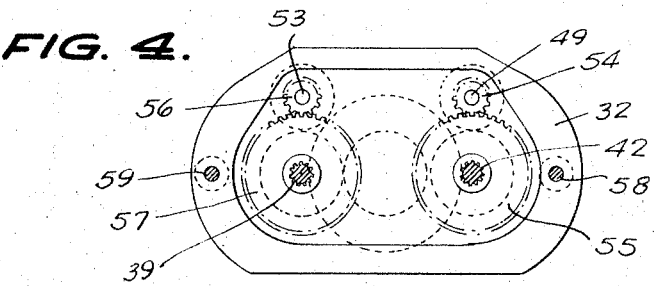
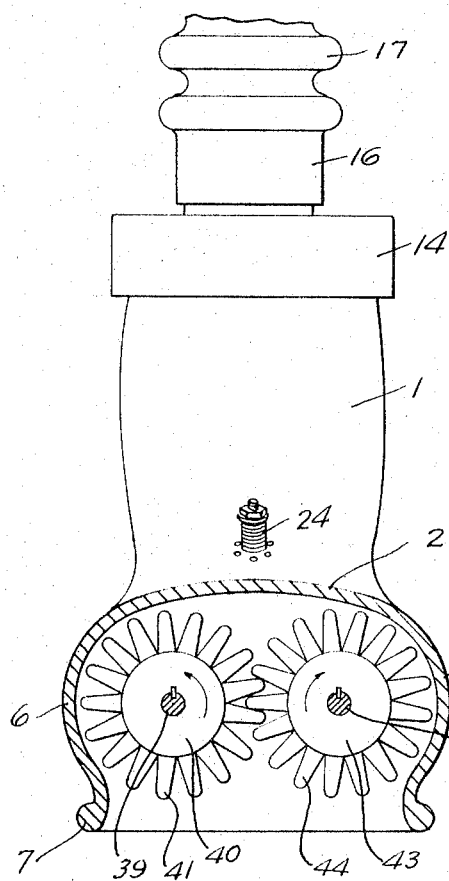
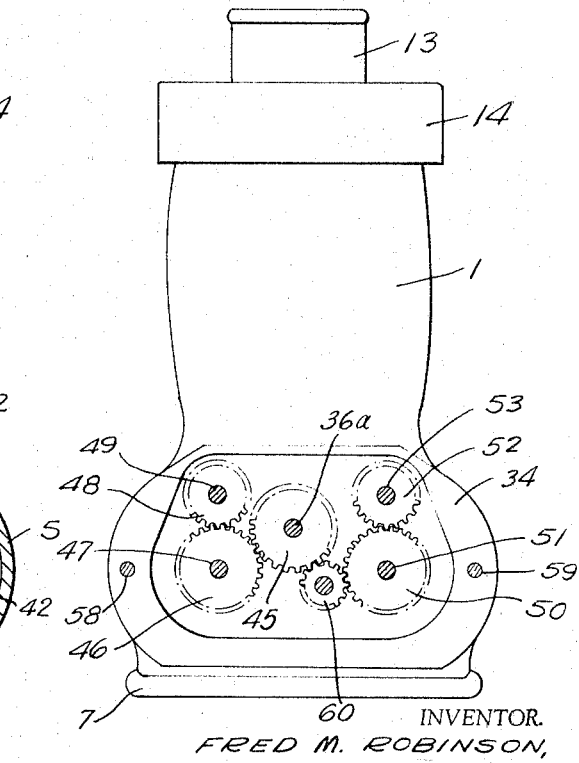
INVENTOR.
FRED M. ROBINSON,
BY
*Linton and Linton*
ATTORNEYS.

United States Patent Office 3,297,024
Patented Jan. 10, 1967

3,297,024
MASSAGING MACHINE HAVING SUCTION MEANS AND OPPOSITELY ROTATING ROLLERS
Fred M. Robinson, 1730 Maywood Place, Clarksdale, Miss. 38614
Filed Nov. 4, 1963, Ser. No. 321,147
6 Claims. (Cl. 128—38)

The present apparatus is concerned with a device for the amelioration of the skin and portions of the body directly beneath the same.

The principal object of the present invention is to provide a manually held, but electrically driven device for being moved over the surface of the skin to massage and stimulate the skin and surface muscles therebeneath, clean clogged pores of the skin, loosen and pull out blackheads on the skin, clear up pimples on the skin as well as giving a relaxing massage.

A further and important object of the present invention is to provide a massaging device which can be quickly and easily disassembled, cleansed and reassembled without requiring special tools and which can be connected to sources of vacuum readily available in the home, such as a conventional vacuum cleaner.

Further objects of the invention will be in part obvious and in part pointed out in the following detailed description of the accompanying drawings, in which:

FIG. 3 is a partly sectional view taken on line 3—3 of FIG. 2;

FIG. 4 is a sectional view taken on line 4—4 of FIG. 2; and

FIG. 5 is a side elevation with the motor removed and viewed in the direction of line 5—5 of FIG. 2.

Figure 1:
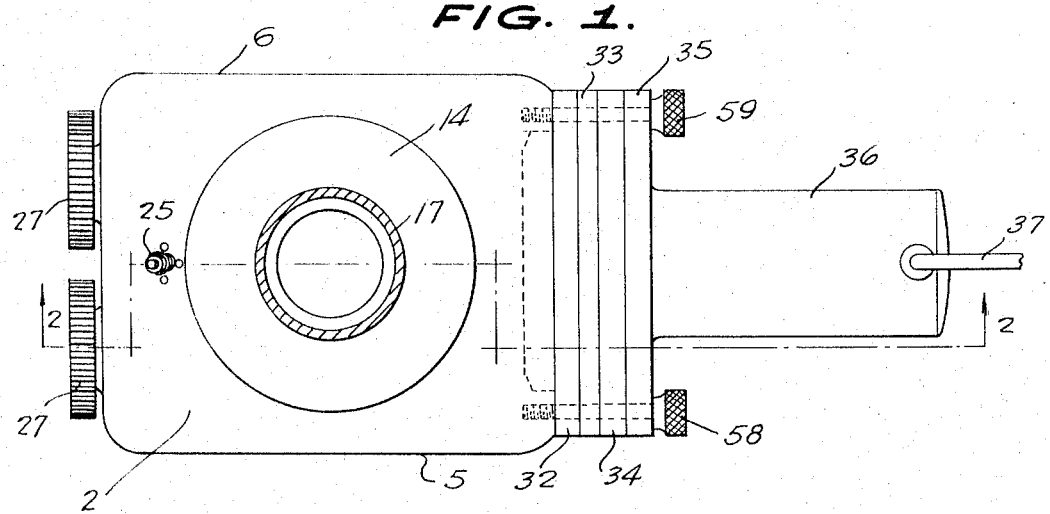
FIG. 1 is a top view of the present device.

Referring now more particularly to the accompanying drawings in which like and corresponding parts are designated by similar reference characters, numeral 1 indicates the tubular handle of the present device from the bottom end of which extends top 2 of the roller housing including side walls 3, 4, 5 and 6 extending downwardly from said top and having a rounded edge 7 forming the mouth of the hollow interior 8 of said housing.

A shoulder 9 extends laterally of the bore 10 of said handle while the upper peripheral end of said handle is threaded at 11. A plate 12 is detachably mounted on the top of said handle and has a tubular extension 13. A cap 14 is in threaded engagement with handle threads 11 and has a flat open top 15 superimposed on plate 12 with tubular extension 13 extending therethrough for receiving the resilient end 16 of a flexible hose 17 connected to a source of a vacuum (not shown). Said hose 17 may be connected to or be part of a conventional vacuum cleaner which can provide the necessary vacuum, if desired.

The base 18 of an air filter cartridge 20 is mounted on shoulder 9 within handle bore 10 and plate 12 is positioned on the top 19 of said cartridge. Said cartridge 20 is of a conventional type.

A plurality of openings 21 extend through top 2 and are covered within the interior 8 of said housing by a valve head 22 whose threaded end shank 23 slideably extends through top 2 and coil spring 24 while a nut 25 is in threaded engagement with shank 23 and is seated on the end of coil spring 24 whereby said spring tends to retain head 22 tight against interior 8 closing openings 21 until suction draws head 22 opening said openings 21. Nut 25 can be adjusted to vary the amount of tension on said spring and thus the amount of vacuum which will draw head 22 from said openings 21.

Figure 2:
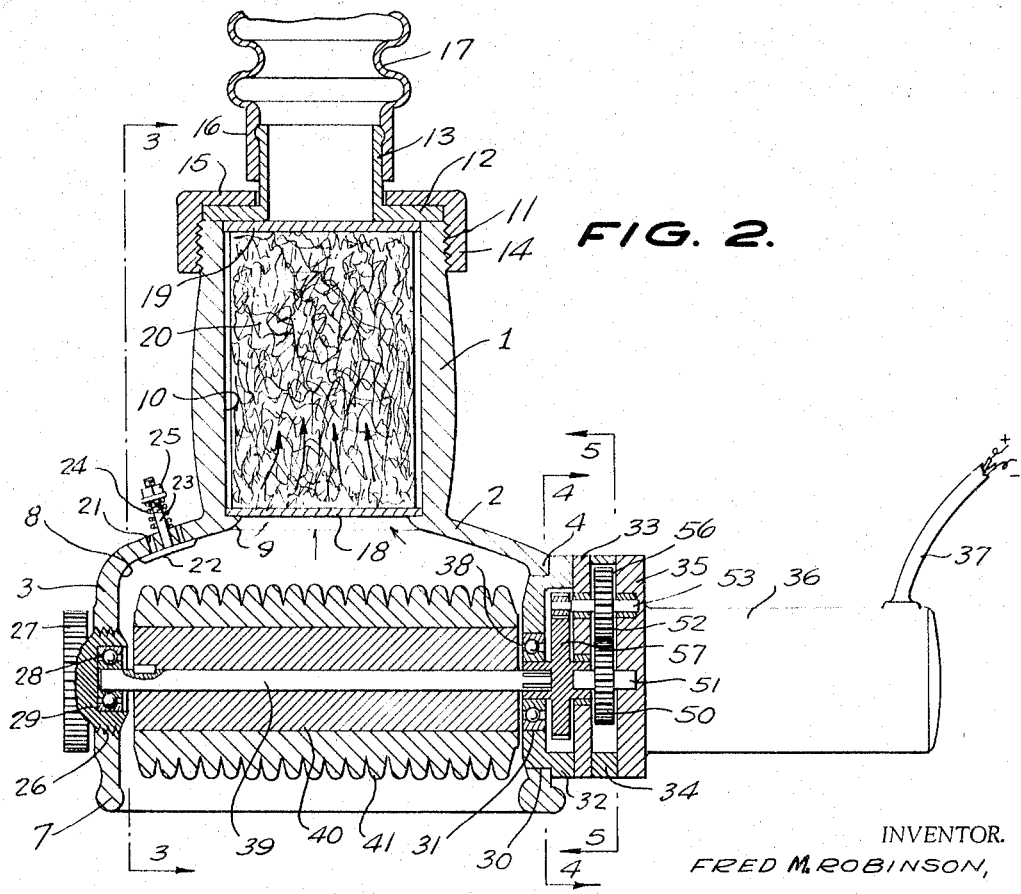
FIG. 2 is a sectional view taken on line 2—2 of FIG. 1.

Wall 3 has a pair of threaded openings 26, one of which is shown in FIG. 2. A pair of threaded caps 27 are each in threaded engagement with one of said openings 26 closing the same and each has an annular recess 28 in which is seated a roller bearing 29.

Wall 4 has an opening 30 closed by a cup-shaped plate 32 detachably seated therein and which plate has a pair of annular openings 31, one of which is shown in FIG. 2, which openings 31 are positioned opposite openings 28 of wall 3.

Plate 33 covers plate 32 and is spaced from plate 35 by a casket-shaped plate 34. An electric motor 36 is integral with plate 35 and has a cord 37 for being connected to a source of electrical current.

A pair of roller bearings 38 are each seated in one of the openings 31 of plates 32, while the opposite ends of shaft 39 are mounted in opposing bearings 29 and 38 and a second shaft 42 has its opposite ends mounted in the second opposing pair of bearings 29 and 38.

A roller 40 is fixedly mounted on shaft 39, while a firm, but pliable rubber tube having a plurality of radial teats 41 is fixedly mounted on said roller and connected thereto by an adhesive. A similar roller 43 is fixedly mounted on shaft 42, while a second firm, but pliable rubber tube having a plurality of teats 44 is fixedly mounted on roller 43 and connected thereto by an adhesive. The teats 41 intermesh with teats 44 as shown in FIG. 3 for a purpose to be described hereinafter.

The drive shaft 36a of electric motor 36 has a pinion 45 fixedly mounted thereon which pinion meshes with a second pinion 46 rotatably supported by shaft 47 and meshing with pinion 48 fixedly mounted on shaft 49 rotatably supported by plates 33 and 35. Shaft 49 has a second pinion 54 fixedly mounted thereon meshing with gear 55 fixedly connected to shaft 42 for driving roller 43 and teats 44.

Pinion 45 also meshes with an idler pinion 60 rotatably supported on a stub axle 61 attached to plate 33 while said idler pinion also meshes with pinion 50 rotatably supported by shaft 51 and pinion 50 meshes with pinion 52 fixedly mounted on shaft 53 rotatably supported by plates 33 and 35. Shaft 53 also has a second pinion 56 fixedly mounted thereon, which pinion 56 meshes with gear 57 fixedly mounted on shaft 39 for driving roller 40 and teats 41.

Said pinions and gears provide a gear train for rotating rollers 40 and 43 at the same speed, but in opposite directions. That is, roller 40 is to rotate counter-clockwise and roller 43 clockwise as viewed in FIG. 3.

Plates 32 to 35 are held together and against wall 4 by a pair of bolts 58 and 59 passing through said plates and in threaded engagement with threaded recesses in wall 4.

In the use of the present device the handle 1 is manually held while cord 37 is attached to a source of current operating motor 36 and driving shafts 39 and 42 through the gear train 45–57 and 60. At the same time hose 17 is connected to any suitable and conventional vacuum producing means. The head 7 is then placed on the skin to be treated and held stationary or moved thereover. The skin is then drawn inwardly by the vacuum and engaged by the teats 41 and 43 which massage and stimulate the skin and the body thereunder and increase the circulation of the blood. Dirt in the pores of the skin is loosened and withdrawn as are blackheads by the combined action of the teats and vacuum. The intermeshing of the teats is particularly effective for this purpose as well as helping in removing pimples on the skin.

Applying a cleansing and lubricating compound such as a cleansing cream aids in the movement of the device over the skin, the creation of a vacuum in the housing, and the massaging and pulling of dirt from the skin.

The present device can be varied in size and speed of operation of the shafts 39 and 42 as well as the vacuum employed as desired to meet particular conditions and treatment of various parts of the body. The distance between the head 7 and the teats 41 and 43 can be determined to meet the various types of skin of users thereof.

The device is therefore capable of considerable modification and such changes thereto as come within the scope of the appended claims is deemed to be a part of the present invention.

I claim:
1. A device for the amelioration of the skin and subjacent portions of the body comprising a tubular handle having one end capable of being connected to a source of a vacuum, a hollow open end housing having a top connected to said handle with the bore of said handle opening therein and a downwardly extending skirt, a pair of shafts rotatably supported by and extending across said skirt, a pair of rubber members fixedly mounted on said shafts for rotation therewith and having intermeshing radial teats and driving means carried by said skirt and connected to said shafts for rotating the same in opposite directions.

2. A device as claimed in claim 1 wherein an air filtering means is positioned within said handle.

3. A device as claimed in claim 1 wherein said housing top has openings therein, a valve has the head thereof positioned within said housing across said openings, the valve stem slideably extends through said housing top and resilient means tend to hold said valve stem with said valve head closing said housing top openings.

4. A device as claimed in claim 1 wherein said skirt has opposing openings, roller bearings are detachably mounted in said skirt openings and support said shafts.

5. A device as claimed in claim 1 wherein said housing skirt has a straight rounded edge forming a bead around the mouth of said housing for engaging the skin to be treated.

6. A device as claimed in claim 1 wherein said handle has a threaded open top, a plate with a tubular extension capable of insertion in a resilient hose is mounted on said handle top and an open cap in threaded engagement with said handle open top retains said plate thereon with said tubular extension extending through said cap.

References Cited by the Examiner

UNITED STATES PATENTS 2,003,272 5/1935 Betz _____ 128—59
2,574,601 11/1951 Swanson _____ 128—57

RICHARD A. GAUDET, *Primary Examiner.*

L. W. TRAPP, *Assistant Examiner.*